United States Patent
Kares

(10) Patent No.: US 10,104,368 B1
(45) Date of Patent: Oct. 16, 2018

(54) THREE-DIMENSIONAL VIEWING APPARATUS AND VIDEO SYSTEM

(71) Applicant: Randy Kares Consulting, LLC., Bonita Springs, FL (US)

(72) Inventor: Randall S. Kares, Bonita Springs, FL (US)

(73) Assignee: Randy Kares Consulting, LLC., Bonita Springs, FL (US)

( * ) Notice: Subject to any disclaimer, the term of this patent is extended or adjusted under 35 U.S.C. 154(b) by 61 days.

(21) Appl. No.: 15/240,267

(22) Filed: Aug. 18, 2016

(51) Int. Cl.
*G02B 27/18* (2006.01)
*H04N 13/339* (2018.01)
*G02B 27/22* (2018.01)

(52) U.S. Cl.
CPC ....... *H04N 13/339* (2018.05); *G02B 27/2242* (2013.01); *H04N 2213/002* (2013.01)

(58) Field of Classification Search
CPC ............ G02B 27/2214; G02B 27/2242; H04N 13/0404; H04N 13/0497; H04N 13/0409; H04N 13/0055; H04N 13/0436; H04N 2213/002; H04N 13/339
USPC ........................................................ 359/462
See application file for complete search history.

(56) References Cited

U.S. PATENT DOCUMENTS

| | | | |
|---|---|---|---|
| 1,658,439 A | 2/1928 | Hammond | |
| 3,502,390 A * | 3/1970 | Gilmore, Jr. | G02B 27/2242 359/466 |
| 4,568,970 A | 2/1986 | Rockstead | |
| 6,580,556 B2 | 6/2003 | Kakizawa | |
| D671,977 S | 12/2012 | Young | |
| 8,611,006 B2 | 12/2013 | Kleinberger et al. | |
| 2002/0008908 A1 | 1/2002 | Yamamoto | |
| 2002/0063957 A1 | 5/2002 | Kakizawa | |
| 2004/0057111 A1 | 3/2004 | Dominguez Montes | |
| 2006/0203339 A1 | 9/2006 | Kleinberger et al. | |
| 2010/0111489 A1* | 5/2010 | Presler | H04N 5/225 386/278 |
| 2011/0261452 A1 | 10/2011 | Kory | |
| 2012/0127283 A1 | 5/2012 | Kim | |
| 2012/0236407 A1* | 9/2012 | Yoon | H04N 13/0429 359/464 |
| 2015/0273304 A1* | 10/2015 | Glynn | A63B 69/0002 473/458 |
| 2016/0147077 A1* | 5/2016 | Woolpert | G02B 27/2242 359/477 |

FOREIGN PATENT DOCUMENTS

WO 2012124984 A3 12/2012

* cited by examiner

*Primary Examiner* — William R Alexander
*Assistant Examiner* — Henry A Duong
(74) *Attorney, Agent, or Firm* — Albert Bordas, P.A.

(57) ABSTRACT

A three-dimensional viewing apparatus and video system, having a viewer assembly with first and second wedge prisms. Each of the first and second wedge prisms has an angled wall, a wall, a wide edge, a narrow edge, and first and second side edges to view over-under 3D videos/images shown on a display. The display is a computer display. The computer has computer software to generate the over-under 3D videos/images. The over-under 3D videos/images have a predetermined distance between them and the over-under 3D videos/images are not aligned vertically. A divider assembly is positioned between the first and second wedge prisms.

18 Claims, 4 Drawing Sheets

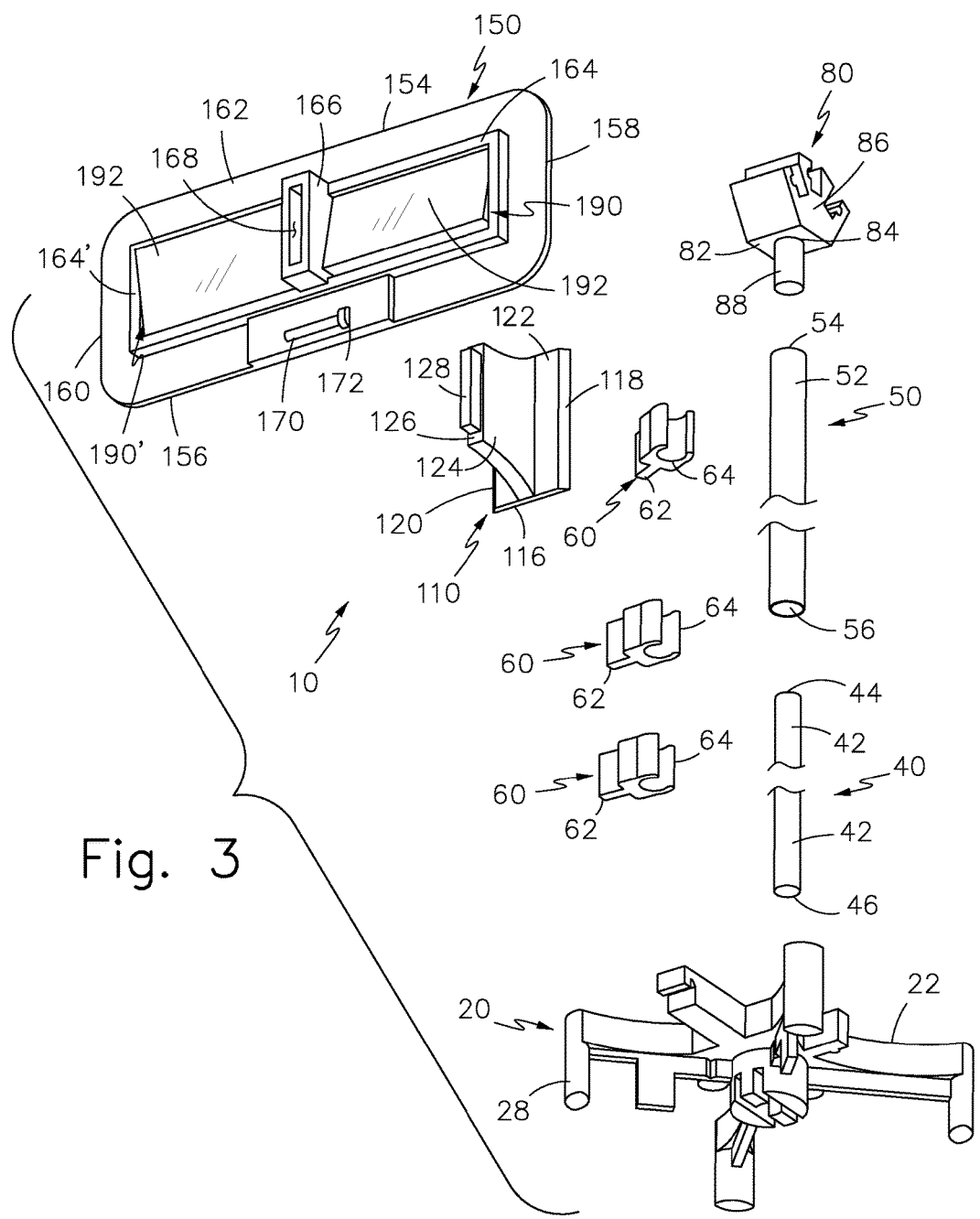

THREE-DIMENSIONAL VIEWING APPARATUS AND VIDEO SYSTEM

II. BACKGROUND OF THE INVENTION

1. Field of the Invention

The present invention relates to three-dimensional viewing systems, and more particularly, to three-dimensional viewing apparatus and video systems.

2. Description of the Related Art

Applicant believes that one of the closest references corresponds to U.S. Patent Application Publication No. 20120236407 A1, published on Sep. 20, 2012 to Eui Shik YOON, et al. for Support Device for Three-Dimensional Glasses. However, it differs from the present invention because Yoon et al. teaches a support device for three-dimensional glasses that includes a stand extending upward and a cradle mounted on the stand to support three-dimensional glasses. The cradle is movable in an up and down direction and rotatable in a left-right direction or an up-down direction. Furthermore, Yoon et al. teaches a device to hold polarized 3d glasses or electronic 3d shutter glasses. The present invention comprises a viewer with prisms and is not used with polarized 3d glasses or 3d shutter glasses. The present invention is used to view only over/under 3d videos or still images.

Applicant believes that another reference corresponds to U.S. Patent Application Publication No. 20120127283 A1, published on May 24, 2012 to Jae Hong KIM for Apparatus and Method for Measuring Picture Quality of Stereoscopic Display Device, and Picture Quality Analyzing Method Using the Same. However, it differs from the present invention because KIM teaches an apparatus and method for measuring picture quality of a stereoscopic display device, and a picture quality analyzing method using the same, which quantify a motion artifact of a 3D moving picture in consideration of even an undesired moving picture artifact caused by a motion and gray-to-gray crosstalk, and moreover measure a motion blur. The picture quality measuring apparatus includes a pattern generator, a 3D display device, a polarization member, a following camera, and an analyzer. The pattern generator generates a right-eye and a left-eye moving picture pattern, which move at a predetermined scroll speed. The 3D display device displays the right-eye and left-eye moving picture pattern inputted from the pattern generator. Furthermore, KIM teaches a device to measure picture quality of a 3d display. The present invention merges two separate over/under video or still images to create a 3d image and has nothing to do with measuring picture quality.

Applicant believes that another reference corresponds to U.S. Patent Application Publication No. 20110261452 A1, published on Oct. 27, 2011 to Michael Kory for Stereoscopic Kaleidoscope and 3D Viewer. However, it differs from the present invention because Kory teaches a binocular kaleidoscope for the purpose of combining the field of repeating patterns associated with kaleidoscopes with stereopsis. A mirror chamber with an object window at the distal end and viewing lenses at the proximal end is utilized, which provides stereopsis covering the entire visual field of both the source material and its reflections. Real depth is provided utilizing physical material such as beads or liquids contained in one or more stacked transparent compartments as the source imagery. Virtual depth is provided utilizing stereoscopic video as the source imagery, in which case a mirrored divider bisects the mirror chamber. The video can be either be previously produced footage or generated in real time by software which can be interactively manipulated by the user in order to change programs or such parameters as color, motion and timing. A handheld device can be used to display the video. The stereoscopic video kaleidoscope described herein may also be adapted for use as a stereoscopic 3D viewer in conjunction with a portable computing device displaying a pair of stereoscopically complementary images. In a stereoscopic 3D viewer, the pair of stereoscopically complementary images enters the left and right eyes of the user along substantially parallel paths, to eliminate or substantially reduce the need for the user to cross his or her eyes and to improve focus and sharpness of the images. In the stereoscopic 3D viewer, baffles are provided to block the extraneous direct view of the pair of stereoscopically complementary images. Furthermore, Kory teaches a 3d Kaleidoscope. The present invention merges two separate over/under video or still images to create a 3d image and is not a Kaleidoscope.

Applicant believes that another reference corresponds to U.S. Patent Application Publication No. 20060203339 A1, published on Sep. 14, 2006 to Paul Kleinberger, et al. for Systems for Three-Dimensional Viewing and Projection. However, it differs from the present invention because Kleinberger teaches a system for three-dimensional viewing and projection aimed at full-color flat-screen binocular stereoscopic viewing without the use of eyeglasses for the viewer. Light emanating from a display or projected thereat presenting a left image and a right image is directed only to the appropriate left or right eyes of at least one viewer using various combinations of light polarizing layers and layers of light rotating means. Furthermore, Kleinberger, et al. teaches a device used with a projection system and specifically without the use of 3d glasses or 3d viewer. The present invention comprises a 3d viewer used to merge two separate over/under video or still images to create a 3d image to be viewed on a television or a computer monitor and not used with a projection system.

Applicant believes that another reference corresponds to U.S. Patent Application Publication No. 20040057111 A1, published on Mar. 25, 2004 to Juan Dominguez Motntes, for Double Active Parallax Barrier for Viewing Stereoscopic Images. However, it differs from the present invention because Motntes teaches two parallax barriers of which at least one is activated electronically, forming a single device, which is placed between the image display system and an observer at a sufficient distance from the latter so as not to bother him/her and through which, with no need for glasses or any other device before the observer's eyes and allowing the observer to move his/her head freely, he/she will be able to see with his/her left eye the image ($I_1$) corresponding to that eye and with his/her right eye the image ($I_2$) corresponding to that eye, these images ($I_2$, $I_2$) being displayed using polarized light and in polarization planes perpendicular to each other or time-multiplexed. Furthermore, Motntes teaches a device used with a projection system and specifically without the use of 3d glasses or 3d viewer. The present invention comprises a 3d viewer to merge two separate over/under video or still images to create a 3d image to be viewed on a television or a computer monitor and is not with a projection system.

Applicant believes that another reference corresponds to U.S. Patent Application Publication No. 20020063957 A1, published on May 30, 2002 to Akira Kakizawa for Viewing Stereoscopic Image Pairs. However, it differs from the present invention because Kakizawa teaches a stereoscopic image pair viewed through a plate having an appropriately sized aperture. When the viewer's left and right eyes view the image pair through the aperture, a stereoscopic effect may result. In one embodiment, a stereoscopic videoconference system may include stereoscopic cameras positioned between the viewer and the apertured plate. Furthermore, Kakizawa teaches an electronic device to view 3d left and right images. The present invention has no electronics and is used to merge two separate over/under video or still images to create a 3d image to be viewed on a television or a computer monitor. It is not electronic and is not to view 3d left and right images.

Applicant believes that another reference corresponds to U.S. Patent Application Publication No. 20020008908 A1, published on Jan. 24, 200 to Masao Yamamoto for Stereoscopic Display Apparatus, Endscope and Microscope Both Using the Apparatus. However, it differs from the present invention because Yamamoto teaches a stereoscopic display apparatus that is employed in combination with an image transmission section. A case includes a half-mirror, a visual field lens and polarizers therein, and an observation port with a hood is defined in the case. A band to be worn on a viewer's head is disposed in the exterior of the case. Both of the polarizers are so designed as to display the stereoscopic images for the right and left eyes on the basis of data transmitted from the image transmission section, respectively, and the image lights are guided to the viewer's eyes through the half-mirror and the visual field lens. The stereoscopic display apparatus is of the head mount type that guides the images for the right and left eyes projected onto one display screen, which is formed of the half-mirror to the right and left eyes.

Applicant believes that another reference corresponds to WIPO Publication No. WO 2012124984 A3, published on Dec. 27, 2012 to JANG SE KI, et al. for Support Device for Three-Dimensional Glasses. However, it differs from the present invention because KI et al. teaches a support device for three-dimensional glasses including a stand extending upward and a cradle mounted on the stand to support three-dimensional glasses. The cradle is movable in an up and down direction and rotatable in a left-right direction or an up-down direction. Furthermore, KI et al. teaches a device to hold polarized 3d glasses or electronic 3d shutter glasses. The present invention comprises a viewer with prisms and is not used with polarized 3d glasses or 3d shutter glasses. The present invention is used to view only over/under 3d videos or still images.

Applicant believes that another reference corresponds to U.S. Pat. No. 8,611,006 B2 issued to Kleinberger, et al. on Dec. 17, 2013 for Systems for Three-Dimensional Viewing and Projection. However, it differs from the present invention because Kleinberger et al. teaches systems for three-dimensional viewing and projection aimed at full-color flat-screen binocular stereoscopic viewing without the use of eyeglasses for the viewer. Light emanating from a display or projected thereat presenting a left image and a right image is directed only to the appropriate left or right eyes of at least one viewer using various combinations of light polarizing layers and layers of light rotating means. Furthermore, Kleinberger, et al. teaches a device used with a projection system and specifically without the use of 3d glasses or 3d viewer. The present invention merges two separate over/under video or still images to create a 3d image to be viewed on a television or a computer monitor and not with a projection system.

Applicant believes that another reference corresponds to U.S. Pat. No. 6,580,556 B2 issued to Kakizawa on Jun. 17, 2003 for Viewing Stereoscopic Image Pairs. However, it differs from the present invention because Kakizawa teaches a stereoscopic image pair viewed through a plate having an appropriately sized aperture. When the viewer's left and right eyes view the image pair through the aperture, a stereoscopic effect may result. In one embodiment, a stereoscopic videoconference system may include stereoscopic cameras positioned between the viewer and the apertured plate. Furthermore, Kakizawa teaches an electronic device that views 3d left and right images. The present invention has no electronics and merges two separate over/under video or still images to create a 3d image to be viewed on a television or a computer monitor. It is not electronic and not used to view 3d left and right images.

Applicant believes that another reference corresponds to U.S. Pat. No. 4,568,970 A issued to Rockstead on Feb. 4, 1986 for Stereoscopic Television System and Apparatus. However, it differs from the present invention because Rockstead teaches a system for producing motion pictures comprising a television camera, television receiver, and a special optical device. The optical device is capable of adjustment to a picture-taking mode wherein the device, when placed before the lens of the camera, produces side-by-side left and right rectangular images of the subject. When adjusted to a viewing mode and utilized to view said side-by-side images on the television receiver, the images are separately delivered to the viewing person's left and right eyes, thereby producing a stereoscopic effect. Furthermore, Rockstead teaches a device to produce motion pictures, creating side-by-side left and right images. The present invention is not used to create motion pictures and is used to view over/under video or still images, and not side by side.

Applicant believes that another reference corresponds to U.S. Pat. No. 1,658,439 A issued to Laurens Hammond on Feb. 7, 1928 for Stereoscopic-Picture-Viewing Apparatus. However, it differs from the present invention because Hammond teaches the construction and disposition of equipment in a theatre through the use of which pictures may be exhibited to a large number of people with resulting stereoscopic effect. A disposition of the equipment in a theatre is necessary for the use of the spectators in order that the pictures may appear in stereoscopic relief. Furthermore, Hammond teaches a device used in a theatre where images are projected on a screen. The present invention is not used in theatres.

Applicant believes that another reference corresponds to U.S. Pat. No. D671,977 S issued to Seo, et al. on Dec. 4, 2012 for Stand for Glasses for Watching 3D Image. However, it differs from the present invention because Seo et al. teaches a particular design for a stand for glasses for watching 3D image that is different. Furthermore, Hammond teaches a device to hold polarized 3d glasses or electronic 3d shutter glasses. The present invention comprises a viewer with prisms and is not used with polarized 3d glasses or 3d shutter glasses. The present invention is used to view over/under 3d videos or still images.

Other patents describing the closest subject matter provide for a number of more or less complicated features that fail to solve the problem in an efficient and economical way. None of these patents suggest the novel features of the present invention.

III. SUMMARY OF THE INVENTION

The instant invention is a three-dimensional viewing apparatus and video system, comprising a viewer assembly having first and second wedge prisms. Each of the first and second wedge prisms comprises an angled wall, a wall, a wide edge, a narrow edge, and first and second side edges to view over-under 3D videos/images shown on a display. The display is a computer display. The computer comprises computer software to play a video. In addition, the computer may also comprise computer software to generate the over-under 3D videos/images. In a preferred embodiment, the over-under 3D videos/images have a predetermined distance between them and the over-under 3D videos/images are not aligned vertically. However, the viewer assembly is able to also view videos/images that are aligned vertically. A divider assembly is positioned between the first and second wedge prisms.

Further comprising a mount assembly. The viewer assembly comprises a locking protrusion to mount onto the mount assembly. The mount assembly comprises at least one channel and at least one slot. The mount assembly also comprises a mount post. Further comprising a sleeve assembly having first and second ends. The first end of the sleeve assembly receives the mount post. Further comprising a post assembly having third and fourth ends. The sleeve assembly receives the post assembly. Further comprising a base assembly. The base assembly comprises at least one hole to receive the post assembly. Further comprising at least one clip assembly. The clip assembly comprises a tension clip having a tension force. The at least one clip assembly secures the sleeve assembly to the mount post, and/or the sleeve assembly to the post assembly.

It is therefore one of the main objects of the present invention to provide a three-dimensional viewing apparatus and video system.

It is another object of this invention to provide a three-dimensional viewing apparatus and video system, comprising a viewer assembly for looking at two over/under images with a left eye image under and a right eye image over, wherein first and second wedge prisms in the viewer assembly move the left image up and the right image down so they appear as one image when looking through the viewer assembly and in three-dimension.

It is another object of this invention to provide a three-dimensional viewing apparatus and video system in which the viewer assembly may slide up and/or down to adjust to any height for viewing, according to heights of people and a table or desk they have a computer on.

It is another object of this invention to provide a three-dimensional viewing apparatus and video system comprising a divider assembly that helps viewing by keeping the right eye from seeing a left viewing hole, and the left eye from seeing a right viewing hole.

It is another object of this invention to provide a three-dimensional viewing apparatus and video system, comprising a mount assembly disposed at an adjustable angle to help the viewer assembly be parallel to a monitor for optimum viewing.

It is another object of this invention to provide a three-dimensional viewing apparatus and video system having a cooperative dimension and shape to be utilized in combination with computer monitors and laptops.

It is another object of this invention to provide a three-dimensional viewing apparatus and video system, whereby first and second wedge prisms each have a shape, dimension, and angle that is best suited for computer viewing.

It is another object of this invention to provide a three-dimensional viewing apparatus and video system comprising clasp assemblies.

It is another object of this invention to provide a three-dimensional viewing apparatus and video system comprising a divider assembly that blocks out peripheral views to focus the viewers' attention on the video.

It is another object of this invention to provide a three-dimensional viewing apparatus and video system, wherein the bottom left image is moved to the left, the top right eye image is moved to the right. This puts each image directly in line with the viewer's eyes so the person viewing to reduce eyestrain.

It is another object of this invention to provide a three-dimensional viewing apparatus and video system that is volumetrically efficient for carrying, transporting, and storage.

It is another object of this invention to provide a three-dimensional viewing apparatus and video system that can be readily assembled and disassembled without the need of any special tools.

It is another object of this invention to provide a three-dimensional viewing apparatus and video system, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 3 is a bottom isometric exploded view of the invention.

V. DETAILED DESCRIPTION OF THE PREFERRED EMBODIMENT

Figure 1:
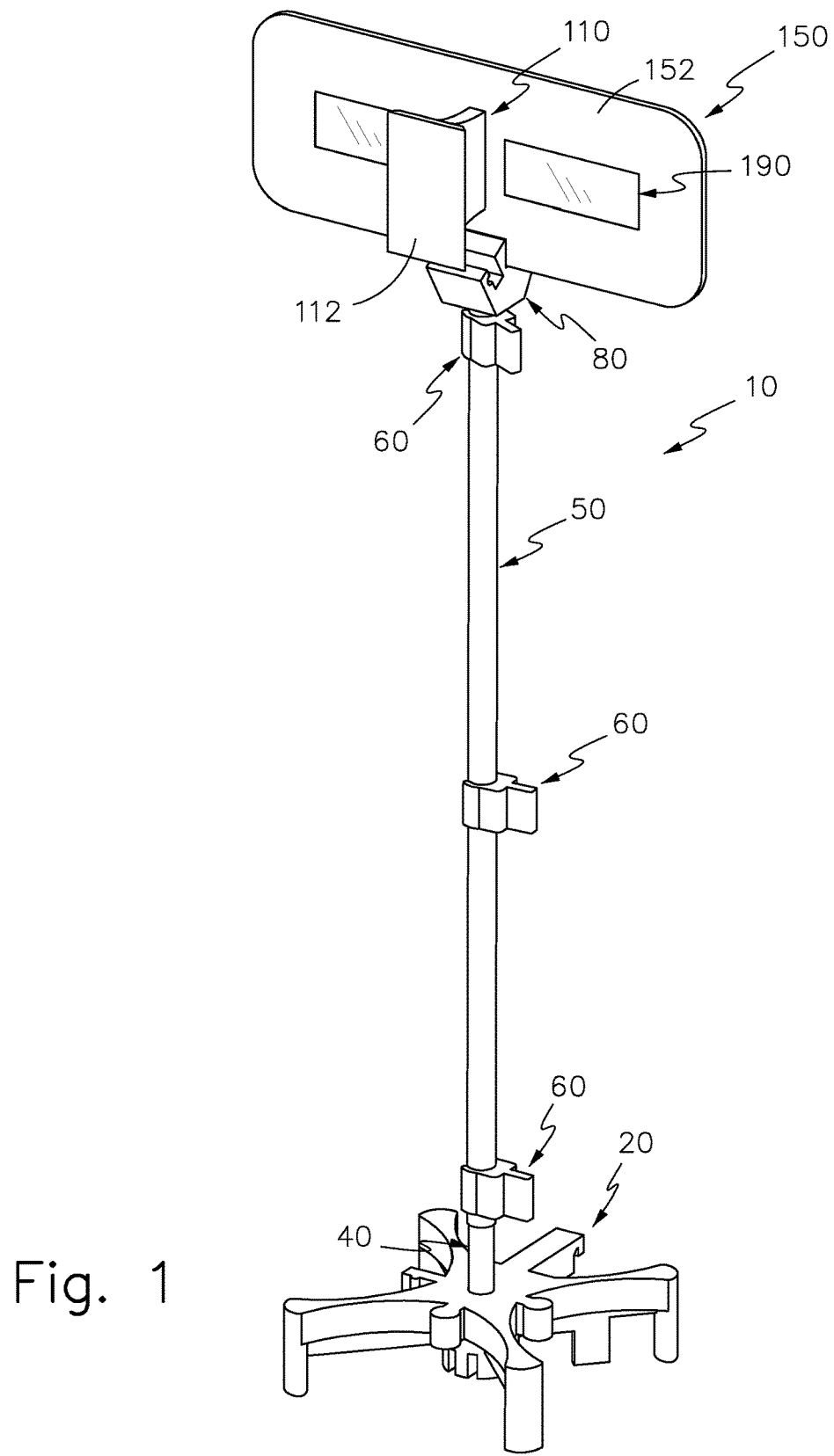
FIG. 1 represents an isometric view of a three-dimensional viewing apparatus and video system.

Referring now to the drawings, the present invention is generally referred to with numeral 10. It can be observed that it basically includes base assembly 20, post assembly 40, sleeve assembly 50, clip assembly 60, mount assembly 80, divider assembly 110, viewer assembly 150, and wedge prisms 190.

As seen in FIG. 1, post assembly 40 is mounted to base assembly 20. Sleeve assembly 50 mounts onto post assembly 40 to enable telescopic positioning of sleeve assembly 50. Once at a desired height or position, sleeve assembly 50 is secured onto post assembly 40 with at least one clip assembly 60. Mount assembly 80 is secured onto sleeve assembly 50, and viewer assembly 150 is mounted onto mount assembly 80. Divider assembly 110 is secured onto viewer assembly 150, and wedge prisms 190 are fixed onto viewer assembly 150.

Figure 2:
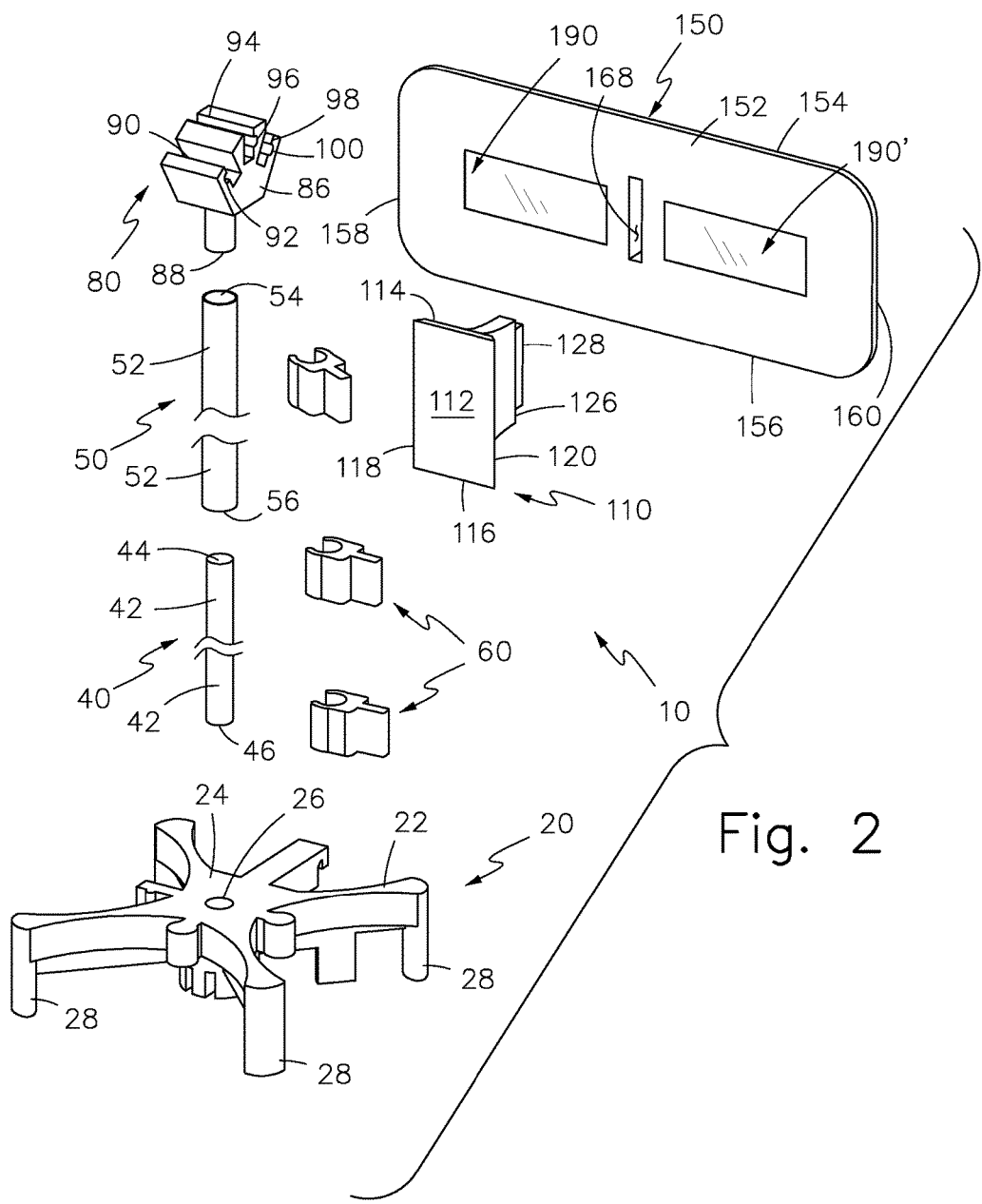
FIG. 2 is a top isometric exploded view of the invention.

As seen in FIGS. 2 and 3, base assembly 20 comprises base 24 having hole 26. End 46 of post assembly 40 is snugly secured into hole 26. Base assembly 20 further comprises frame 22 with legs 28.

Post assembly 40 comprises post 42 with ends 44 and 46. Sleeve assembly 50 comprises sleeve 52 with ends 54 and 56. Post assembly 40 is partially inserted within sleeve assembly 50. Specifically, end 44 is introduced through end 56 a predetermined distance, whereby a user/viewer telescopically adjusts sleeve assembly 50 to a desired height on post assembly 40.

Each clip assembly 60 comprises handle 62 and tension clip 64 having a tension force. When three-dimensional viewing apparatus and video system 10 is assembled, at least one clip assembly 60 is mounted to secure sleeve assembly 50 to the desired height on post assembly 40, and/or mount post 88 onto sleeve 52. The ability to slide viewer assembly 150 up and down is desired to adjust to any height for viewing. The varying heights of the user/viewer, and a table or desk they have computer 230 on, will require viewer assembly 150 to have an adjustable height.

Mount assembly 80 comprises mount base 82 and sidewalls 86. Extending from mount base 82 is mount post 88. Mount post 88 is snugly inserted into end 54 of sleeve assembly 50 and is secured with a tension clip 64. Mount assembly 80 further comprises channels 90, 94, and 98 with respective slots 92, 96, and 100. In a preferred embodiment, channel 94 is in a substantially vertical orientation, and channels 90 and 98 are at predetermined angles with respect to channel 94. It is noted that slot 92 is positioned in an opposite orientation as opposed to slots 96 and 100. In a preferred embodiment, viewer assembly 150 is secured onto mount assembly 80 to help viewer assembly 150 be parallel to display 232 for optimum viewing.

Divider assembly 110 keeps the user/viewer's right eye from seeing left wedge prism 190, and the user/viewer's left eye from seeing right wedge prism 190'. Divider assembly 110 comprises face 112, seen in FIG. 2, having top edge 114, bottom edge 116, and side edges 118 and 120. Divider assembly 110 further comprises interior face 122, seen in FIG. 3. Extending from interior face 122 is extension 124 with interior edge 126. Protrusion 128 extends from interior edge 126.

Viewer assembly 150 is mounted onto any of channels 90, 94 or 98 according to a user/viewer's preference. Viewer assembly 150 comprises interior face 152, seen in FIG. 2, and exterior face 162, seen in FIG. 3. Viewer assembly 150 further comprises top edge 154, bottom edge 156, and side edges 158 and 160. Exterior face 162 comprises frame 164 having interior perimeter angled wall 164'. In a preferred embodiment, interior perimeter angled wall 164' is specifically designed so that it allows for minimal plastic to abut wedge prisms 190 and 190', and is designed not to be seen by the viewer in order minimize reflection, which is a distraction.

Divider protrusion 166 extends from frame 164. Cavity 168 extends from interior face 152 to divider protrusion 166. Exterior face 162 further comprises locking protrusion 170 with stop 172. When viewer assembly 150 is mounted onto any of channels 90, 94 or 98, a respective slot 92, 96 or 100 slides onto locking protrusion 170 until sidewalls 86 reach stop 172.

In a preferred embodiment, widths of viewing holes of viewer assembly 150 and wedge prisms 190 and 190' are a correct size for viewing approximately 16:9 aspect ratio images of videos. The width and height of the viewing holes of viewer assembly 150 are specifically designed for focusing the viewer's eyes on the video meant for each eye on display 232 of computer 230 seen in FIG. 4, which provide less distraction to the viewer. The size of each viewing hole of viewer assembly 150 is matched to a size of wedge prisms 190 and 190' respectively so that the viewer does not see any of wedge prisms' 190 and 190' edges that could cause distraction.

Figure 3A:
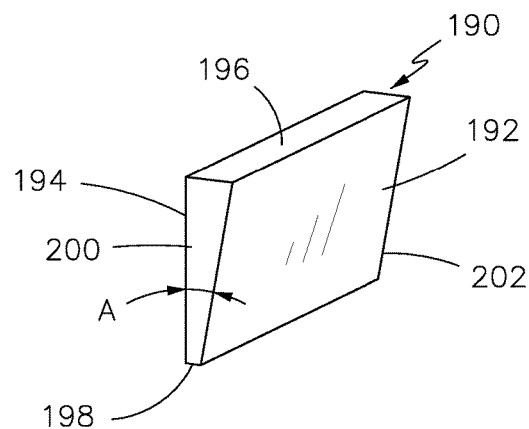
FIG. 3A is an isometric view of a wedge prism.

As seen in FIGS. 3 and 3A, wedge prisms 190 and 190' are secured to frame 164. Wedge prisms 190 and 190' each have angled wall 192 and wall 194. In a preferred embodiment, angled wall 192 is disposed at an angle A of approximately 13 degrees with respect to wall 194. Wedge prisms 190 and 190' further comprise wide edge 196, narrow edge 198, and side edges 200 and 202.

In a preferred embodiment, wedge prisms 190 and 190' have the following characteristics and dimensions:
Surfaces polished to:
a) S/D: 80/50
b) Flatness: 2 waves@633 nm
c) Wedge: +/−5 arc min
d) Bevel: 0.2 mm×45 deg
e) Refractive Index: 1.58%
Dimension tolerance is +/−0.3 mm; 46 mm by 22 mm by 6.20 mm at wide edge 196. Corner R1×10; color transparent; finishing—Fine Grind. Wedge prisms 190 and 190' can be made of, but are not limited to, plastic or glass.

Figure 4:
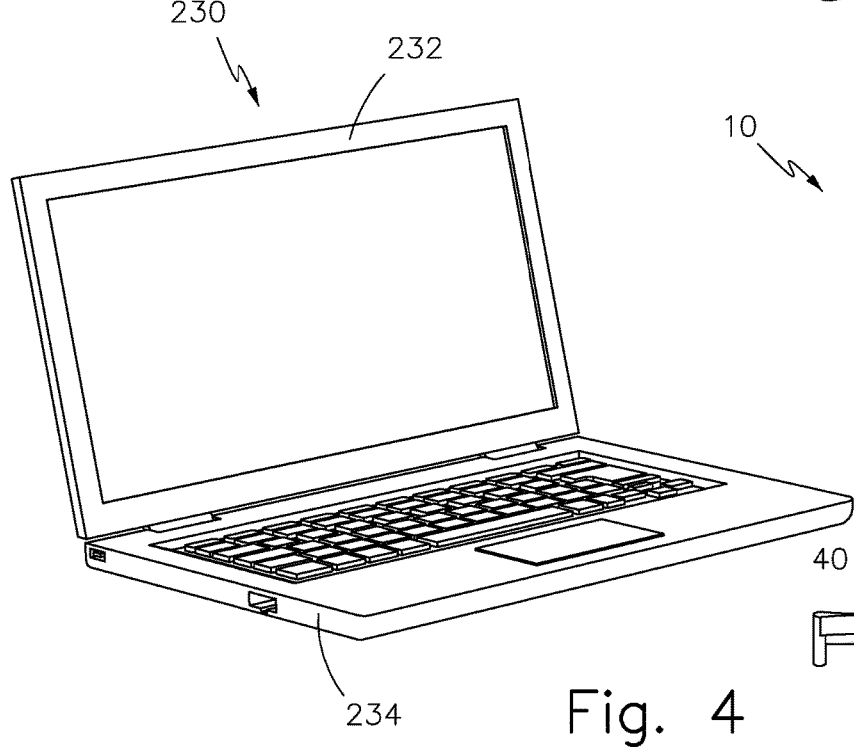
FIG. 4 is an isometric view of the invention, showing the viewer assembly adjusted at an angle to facilitate the viewing of three-dimensional video on a laptop computer.

In a preferred embodiment, a thickness of viewer assembly 150 at wedge prisms 190 and 190' is specifically designed to be a minimal thickness to cause minimal reflection to viewer assembly 150 from display 232 of computer 230 seen in FIG. 4. In addition, viewer assembly 150 is specifically designed to be black in color to cause the least amount of reflection of viewer assembly 150 from display 232 of computer 230 seen in FIG. 4.

As seen in FIG. 4, viewer assembly 150 is secured onto mount assembly 80 to facilitate the viewing of three-dimensional video shown on display 232 of computer 230 having body 234. Viewer assembly 150 is made for looking at two over under videos/images generated on display 232 with the left eye image under and the right eye image over.

It is noted that computer software of the present invention generates over-under 3D videos/images generated on display 232.

It is noted that prior art over-under 3D videos/images are in-line with each other vertically, and touch with no space between. Meaning, that the over and under 3D videos/images meet.

In contrast, the computer software of the present invention separates the video/image a predetermined distance and also moves the bottom left video/image to the left and the top right video/image to the right. This helps give more latitude in head and eye movement of viewer assembly 150 to lock in on the 3D, three-dimensional image and not see additional images, whereby wedge prisms 190 and 190' in viewer assembly 150 move the left image up and the right image down so they appear as one image when looking through viewer assembly 150 and in 3D. This puts each image directly in line with the viewer's eyes so the person viewing has less eyestrain from looking cross-eyed a little. In a preferred embodiment, this distance is approximately two inches, whereby the left image is moved left approximately one inch, and the right image is moved right approximately one inch.

Computer 230 is a programmable machine. Two principal characteristics of computer 230 are that it responds to a specific set of instructions in a well-defined manner and it can execute a prerecorded list of instructions, a computer program. Generally, computers are electronic and digital. The actual machinery, wires, transistors, and circuits are called hardware; the instructions and data are called software.

All general-purpose computers comprise the following hardware components: memory: enables a computer to store, at least temporarily, data and programs; mass storage device: allows a computer to permanently retain large amounts of data. Common mass storage devices include solid state drives or disk drives and tape drives; input devices: usually a keyboard and mouse, the input device is the conduit through which data and instructions enter a computer; output devices: display 232 that is a display screen or monitor, printer, or other device that lets you see what the computer has accomplished; and a central processing unit. In addition to these components, many others make it possible for the basic components to work together efficiently. For example, every computer comprises a bus that transmits data from one part of the computer to another. Computer 230 may be, but is not limited to being, a smartphone, tablet, personal computer, workstation computer, minicomputer, mainframe, and/or a supercomputer.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A three-dimensional viewing apparatus and video system, comprising:
   A) a viewer assembly comprising a viewer assembly interior face and an exterior face, said exterior face comprises a frame having an interior perimeter angled wall, said viewer assembly further comprising first and second wedge prisms, whereby said first and second wedge prisms are fixed onto said viewer assembly, each of said first and second wedge prisms comprising an angled wall, a wall, a wide edge, a narrow edge, and first and second side edges to view over-under 3D videos/images shown on a display, said display is a computer display of a computer, said computer comprises computer software to generate said over-under 3D videos/images; and
   B) a divider assembly that is secured onto viewer assembly and positioned between said first and second wedge prisms, said divider assembly comprises a face having a top edge, a bottom edge, and third and fourth side edges, said divider assembly further comprises a divider assembly interior face, extending from said divider assembly interior face is an extension with an interior edge, and a protrusion extends from said interior edge.

2. The three-dimensional viewing apparatus and video system set forth in claim 1, further comprising a mount assembly, said viewer assembly mounts onto said mount assembly.

3. The three-dimensional viewing apparatus and video system set forth in claim 2, further characterized in that said mount assembly comprises at least one channel.

4. The three-dimensional viewing apparatus and video system set forth in claim 2, further characterized in that said mount assembly comprises at least one slot.

5. The three-dimensional viewing apparatus and video system set forth in claim 2, further characterized in that said mount assembly comprises a mount post.

6. The three-dimensional viewing apparatus and video system set forth in claim 5, further comprising a sleeve assembly having first and second ends.

7. The three-dimensional viewing apparatus and video system set forth in claim 6, further characterized in that said first end of said sleeve assembly receives said mount post.

8. The three-dimensional viewing apparatus and video system set forth in claim 6, further comprising a post assembly having third and fourth ends.

9. The three-dimensional viewing apparatus and video system set forth in claim 8, further characterized in that said sleeve assembly receives said post assembly.

10. The three-dimensional viewing apparatus and video system set forth in claim 8, further comprising a base assembly.

11. The three-dimensional viewing apparatus and video system set forth in claim 10, further characterized in that said base assembly comprises at least one hole to receive said post assembly.

12. The three-dimensional viewing apparatus and video system set forth in claim 10, further comprising at least one clip assembly.

13. The three-dimensional viewing apparatus and video system set forth in claim 12, further characterized in that said clip assembly comprises a tension clip having a tension force.

14. The three-dimensional viewing apparatus and video system set forth in claim 12, further characterized in that said at least one clip assembly secures said sleeve assembly to said mount post.

15. The three-dimensional viewing apparatus and video system set forth in claim 12, further characterized in that said at least one clip assembly secures said sleeve assembly to said post assembly.

16. The three-dimensional viewing apparatus and video system set forth in claim 1, further comprising a mount assembly, said viewer assembly comprises a locking protrusion to mount onto said mount assembly.

17. The three-dimensional viewing apparatus and video system set forth in claim 1, further characterized in that said over-under 3D videos/images have a predetermined distance between them.

18. The three-dimensional viewing apparatus and video system set forth in claim 1, further characterized in that said over-under 3D videos/images are not aligned vertically.

* * * * *